(12) United States Patent
Gong et al.

(10) Patent No.: US 8,295,063 B2
(45) Date of Patent: Oct. 23, 2012

(54) SYSTEM AND METHOD FOR DAMPING LC CIRCUITS IN POWER CONVERSION SYSTEMS

(75) Inventors: Maozhong Gong, Shanghai (CN); Zhuohui Tan, Shanghai (CN); Xiaoming Yuan, Shanghai (CN); Xueqin Wu, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/080,321

(22) Filed: Apr. 5, 2011

(65) Prior Publication Data

US 2012/0063179 A1 Mar. 15, 2012

(51) Int. Cl.
*H02M 1/12* (2006.01)
*H02M 1/14* (2006.01)
(52) U.S. Cl. .................................................. 363/40
(58) Field of Classification Search .............. 363/37, 363/34, 50, 52, 53, 81, 84, 40
See application file for complete search history.

(56) References Cited

U.S. PATENT DOCUMENTS

| | | | | |
|---|---|---|---|---|
| 5,847,943 A * | 12/1998 | Vogel | | 363/37 |
| 6,166,929 A | 12/2000 | Ma et al. | | |
| 6,580,248 B2 * | 6/2003 | Raith et al. | | 363/40 |
| 7,035,124 B2 * | 4/2006 | Chadwick et al. | | 363/40 |
| 7,372,174 B2 | 5/2008 | Jones et al. | | |
| 7,423,411 B2 * | 9/2008 | Sihler | | 322/19 |
| 7,663,348 B2 | 2/2010 | Oohara et al. | | |
| 2003/0035308 A1 * | 2/2003 | Lynch et al. | | 363/34 |
| 2009/0251933 A1 | 10/2009 | Angerer et al. | | |

OTHER PUBLICATIONS

Anca Julean, 2009, Aalborg University, PED10-1035, 1-93.*
Fang Z. Peng, Yun Wei Li and Leon M. Tolbert, Control and protection of power electronics interfaced distributed Generation systems in a customer-driven microgrid, EECS, date Jul. 2009 http://web.eecs.utk.edu/~tolbert/publications/pes_2009.pdf.

* cited by examiner

*Primary Examiner* — Jue Zhang
(74) *Attorney, Agent, or Firm* — GE Global Patent Operation; Peter T. DiMauro

(57) ABSTRACT

A power conversion system comprises a power converter comprising a plurality of semiconductor power switches, an LC filter coupled between an output of the power converter and an electric grid, and a power conversion control system. The LC filter comprises an inductor coupled in series to the electric grid, and a capacitor. The LC filter and the grid result in an equivalent LC circuit comprising an impedance of the LC filter and an impedance of the electric grid. The power conversion control system comprises a damper and a converter controller. The damper receives an LC filter signal and an equivalent LC circuit impedance signal and generates a damping signal. The converter controller receives a current or voltage reference signal, a current or voltage command signal, and the damping signal to generate control signals for driving switching operations of the semiconductor power switches.

17 Claims, 8 Drawing Sheets

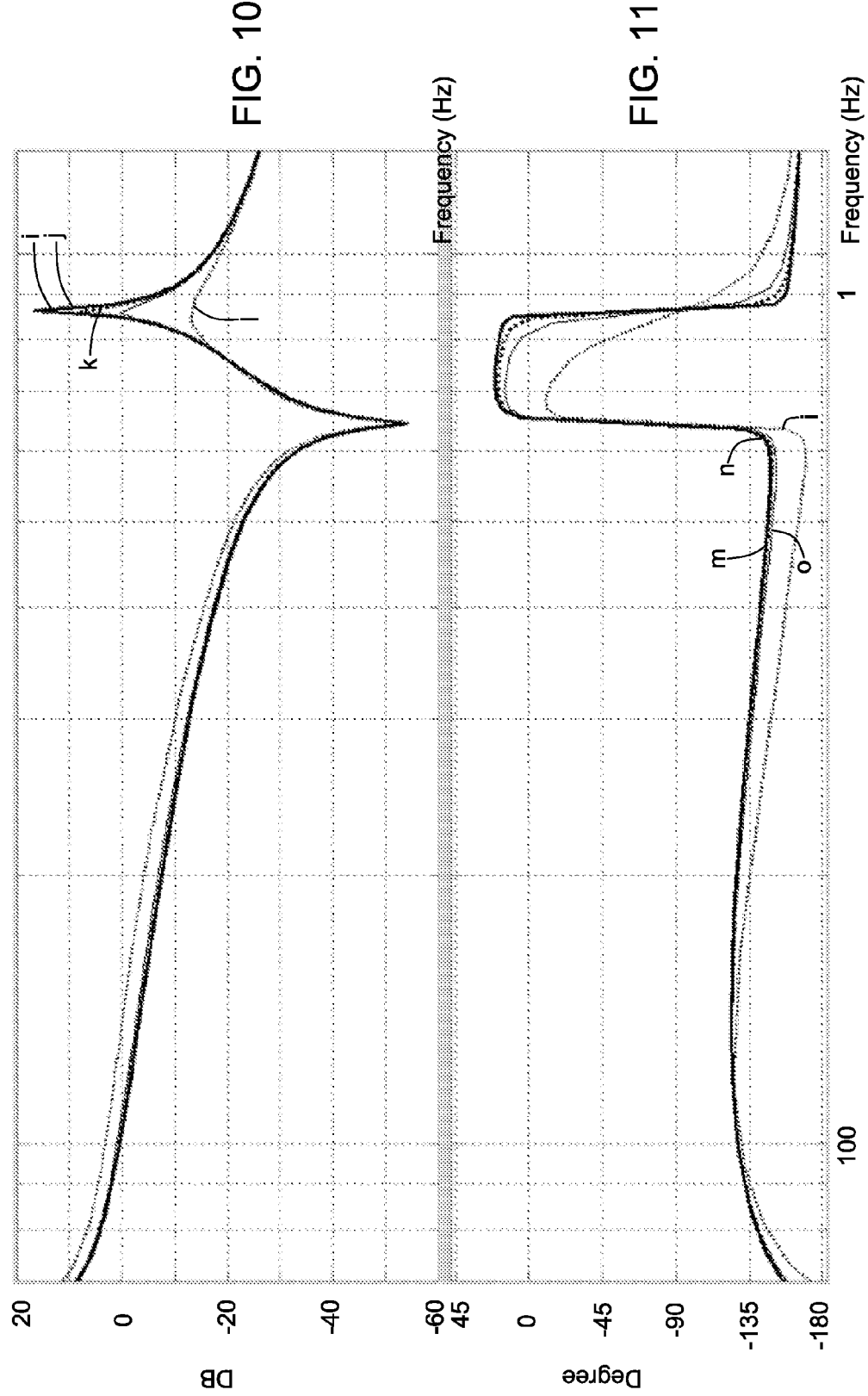

SYSTEM AND METHOD FOR DAMPING LC CIRCUITS IN POWER CONVERSION SYSTEMS

BACKGROUND

The invention relates generally to LC circuits and, more specifically, to a method and apparatus for damping of an LC circuit between a power converter and an electric grid.

Renewable power generation systems include power sources such as solar panels or wind turbines, for example, and power converters for converting power from the power sources into power having an alternating current with controlled amplitude and frequency. It is desirable that the alternating current supplied to an electric grid be synchronous with the grid voltage or current and that harmonic components are minimized. Some power systems use LC filters to minimize high frequency harmonics.

A typical LC filter includes inductors and capacitors. LC filter resonance is defined as the condition when the inductive reactance and capacitive reactance of the LC filter are of equal magnitude. The frequency at which resonance occurs is defined as the resonant frequency. Mathematically, the resonance frequency may be expressed as:

$$fr = \frac{1}{2\pi\sqrt{LC}}$$

wherein "L" is the equivalent inductance, "C" is the equivalent capacitance, and "$f_r$" is the resonant frequency. At the resonant frequency $f_r$, the impedance of the filter is minimal. Accordingly, a resonance peak may be excited by the high frequency harmonics and delivered to the grid. To attenuate such a resonance peak, a damper for the LC filter may be used.

One conventional method of damping an LC filter is to couple a physical resistor in series or in parallel with the capacitor of the LC filter. Drawbacks to the resistor embodiment are that an undesirably large amount of power is consumed by the resistor and that the LC filter becomes more bulky because the resistor occupies significant space.

Ma et al., U.S. Pat. No. 6,166,929, described a method of damping an LC filter between a three-phase inverter and a motor by simulating a damping resistor connected in parallel with each output capacitor of the LC filter. The simulation included a determination of how much current would flow through a resistor had it been there and deducting that amount of current from a current command that is used to control the inverter. The damping method described by Ma et al. is very specific to motors and has some of the benefits of a physical damping resistor without the corresponding energy loss.

As compared with motors, when providing power from renewable power sources to an electric grid, there are more variations and transient events. In addition, simulating a physical damping resistor for damping an LC filter in the inverter control may adversely affect stability of power conversion control.

There is a need in the art to provide an improved method and system for damping an LC circuit between a power source and an electric grid which differs from conventional methods or systems and addresses one or more of the above discussed problems.

BRIEF DESCRIPTION

In accordance with one embodiment disclosed herein, a power conversion system comprises a power converter comprising a plurality of semiconductor power switches, an LC filter coupled between an output of the power converter and an electric grid, and a power conversion control system. The LC filter comprises an inductor coupled in series to the electric grid, and a capacitor. The LC filter and the grid result in an equivalent LC circuit comprising an impedance of the LC filter and an impedance of the electric grid. The power conversion control system comprises a damper and a converter controller. The damper receives an LC filter signal and an equivalent LC circuit impedance signal, and generates a damping signal. The converter controller receives a current or voltage reference signal, a current or voltage command signal, and the damping signal to generate control signals for driving switching operations of the semiconductor power switches.

In accordance with another embodiment disclosed herein, a method is provided for damping an equivalent LC circuit between a power converter and an electric grid. The equivalent LC circuit comprises an impedance of an LC filter coupled between the power converter and the electric grid, an impedance of the electric grid, and a capacitor. The method comprises receiving a current or voltage signal of the capacitor, receiving an equivalent LC circuit impedance, estimating a resonance frequency of the LC circuit according to the equivalent LC circuit impedance, determining a resistance value for obtaining sufficient resonance peak attenuation and maintaining an adequate phase margin of the power converter, generating a damping signal based on the resistance value and the current or voltage signal of the capacitor; and using the damping signal to generate current or voltage commands to control the power converter.

In accordance with another embodiment disclosed herein, a power system comprises a photovoltaic power source to generate a direct current at a DC link, and a power conversion system to transform the direct current from the DC link into an alternating current. The power conversion system comprises a power converter comprising a plurality of semiconductor power switches, an LC filter coupled between an output of the power converter and an electric grid, and a power conversion control system. The LC filter comprises an inductor coupled in series to the electric grid, and a capacitor. The LC filter and the grid result in an equivalent LC circuit comprising an impedance of the LC filter and an impedance of the electric grid. The power conversion control system comprises a damper and a converter controller. The damper receives an LC filter signal and an equivalent LC circuit impedance signal, and generates a damping signal. The converter controller receives a current or voltage reference signal, a current or voltage command signal, and the damping signal to generate control signals for driving switching operations of the semiconductor power switches.

DRAWINGS

These and other features, aspects, and advantages of the present invention will become better understood when the following detailed description is read with reference to the accompanying drawings in which like characters represent like parts throughout the drawings, wherein:

FIG. 10 is a graph of resonance peak attenuation using different damping resistor values within the simulation method according to the embodiment of FIG. 9.

FIG. 11 is a graph of phase margin of the power conversion module using different resistor values within the simulation method according to the embodiment of FIG. 9.

DETAILED DESCRIPTION

Embodiments of the invention relate to damping an LC circuit between a power converter and an electric grid. As used herein after, "LC circuit" refers to any equivalent circuit comprising capacitive and inductance components, and "LC filter" comprises any filter comprising capacitive and inductance components. In certain embodiments of the invention, the LC circuit comprises impedances of an LC filter comprising capacitive and inductive components, equivalent impedances of transmission lines and other electronic components between the converter and the grid, and an equivalent impedance of the grid. A damper receives estimated or measured equivalent LC circuit impedance signals and generates damping signals according to the estimated or measured equivalent LC circuit impedance signals. A converter controller uses the damping signals to control the converter.

Figure 1:
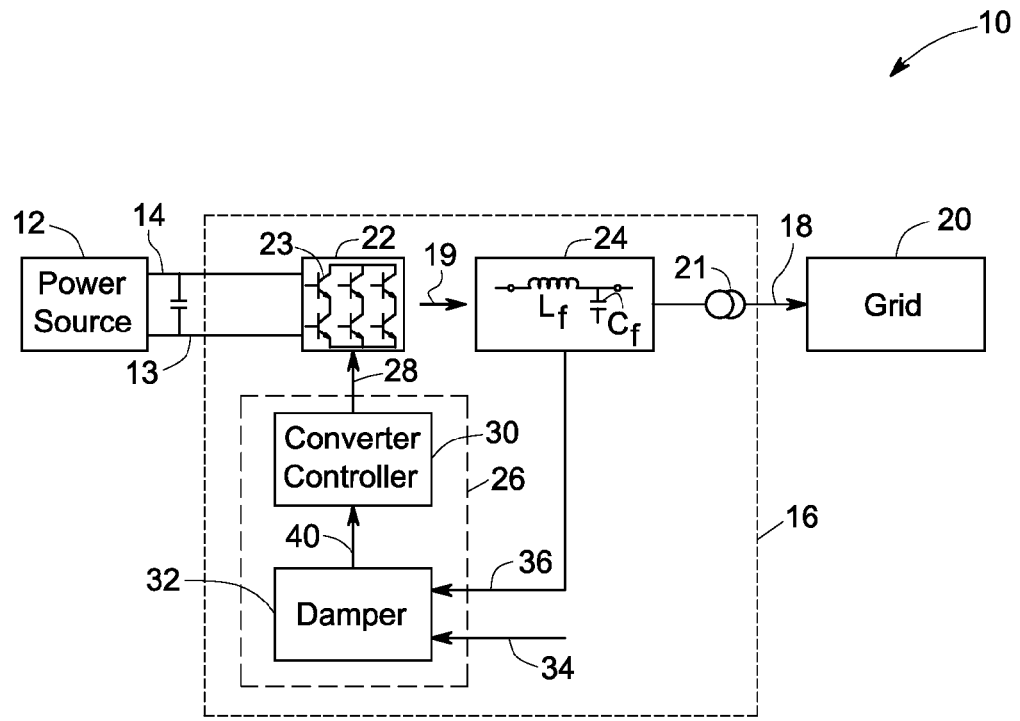
FIG. 1 is a block diagram of a power generation system in accordance with one embodiment of the present invention.

Referring to FIG. 1, a power generation system 10 comprises a power source 12. In one embodiment, as shown, power source 12 directly provides a direct current 14. In certain other embodiments, a DC-to-DC converter (not shown) is coupled to power source 12 to control the DC current 14. In another embodiment, power source 12 may provide alternating current which is then converted to direct current by a AC to DC converter (not shown). Power generation system 10 further comprises a power conversion module 16 for converting direct current 14 into an alternating current 18 which is further fed to an electric grid 20. Power source 12 may comprise a renewable power source such as a photovoltaic module or a wind turbine generator, for example. In the illustrated embodiment, power generation system 10 comprises a DC link 13 with a temporary energy storage device, such as a capacitor, receiving direct current 14.

In the embodiment of FIG. 1, power conversion module 16 comprises a power converter 22 ("converter 22"), an LC filter 24 for filtering an alternating current 19 output from converter 22 into alternating current 18, and a power conversion control system 26 ("control system 26") for generating control signals 28 for converter 22. In the illustrated embodiment, LC filter 24 comprises an inductor ($L_f$) in serial connection with grid 20, and a filter capacitor ($C_f$) in parallel with grid 20 for the purpose of smoothing alternating current 19 and blocking high frequency components from flowing into grid 20. In certain embodiments, power conversion module 16 may comprise other electronic components, such as a transformer 21 for stepping up alternating current 19 to a higher voltage.

In one embodiment, as shown in FIG. 1, converter 22 has a three-phase two-level topology with a series of semiconductor power switches 23 fully controlled and regulated using a pulse width modulation (PWM) strategy. The semiconductor power switches 23 may comprise any appropriate devices with several examples including Insulated Gate Bipolar Transistors (IGBTs), Gate Communicated Thyristors (GCTs), and Metal Oxide Semiconductor Field Effect Transistors (MOSFETs). In other embodiments, converter 22 comprises other multi-level converters such as five-level converters. In the illustrated embodiment, control signals 28 generated by control system 26 are PWM control signals which control switching of switches 23 to transform direct current 14 into a three-phase alternating current 19 with a controlled voltage and frequency.

In certain embodiments, alternating current 19 from converter 22 has a fundamental frequency $f_1$. The switching actions of switches 23 will tend to cause undesirable harmonics at frequencies other than the fundamental frequency $f_1$ in alternating current 19. LC filter 24 is designed to block most of the harmonics and allow the fundamental waveform at the fundamental frequency $f_1$ to pass to grid 20.

Figure 2:
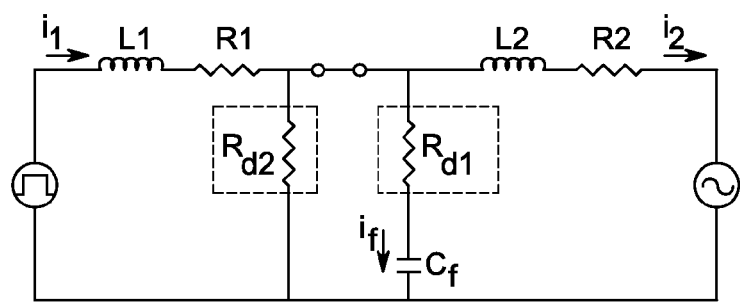
FIG. 2 is a circuit diagram of an equivalent LC circuit.

In certain embodiments, an equivalent LC circuit is formed between converter 22 and grid 20, as is illustrated in FIG. 2. The equivalent LC circuit comprises a converter side impedance, a grid side impedance, and capacitor $C_f$ between the converter side impedance and the grid side impedance. In the illustrated embodiment, the converter side impedance comprises a converter side inductance $L_1$, and a converter side resistance $R_1$, the grid side impedance comprises a grid side inductance $L_2$ and a grid side resistance $R_2$. In certain embodiments, converter side inductance $L_1$ and converter side resistance $R_1$ primarily result from the inductance and resistance of LC filter 24 while grid side inductance $L_2$ primarily results from grid inductance $L_g$ and inductance $L_r$ of other components (such as the transformer 21) or the transmission line between LC filter 24 and grid 20, and grid side resistance $R_2$ primarily results from grid resistance $R_g$ and resistance $R_r$ of other electronic components between LC filter 24 and grid 20. In other embodiments, the converter side and grid side impedances may further comprise capacitance components. The LC circuit has electrical resonance at a resonance frequency ($f_0$) when the impedance between the input and output of the LC circuit is at a minimum. Accordingly, without a damper for the LC circuit, the high frequency resonance may be excited by the harmonics of the resonance frequency $f_0$ in alternating current 19 or in grid 20.

One conventional method of damping the equivalent LC circuit of FIG. 2 is to couple a physical damping resistor $R_{d1}$ in parallel with the capacitor $C_f$, or to couple a physical damping resistor $R_{d2}$ in series with the capacitor $C_f$. The damping resistor $R_{d1}$ or $R_{d2}$ shares the resonance energy to attenuate the resonance peak at the resonance frequency $f_0$. As discussed above, such resistors adversely consume power. In certain embodiments, the converter side impedance of the LC circuit has a smaller variation than the gird side impedance. Variation of grid conditions may induce variations to the grid side impedance which, in turn, creates variations in the resonance frequency $f_0$ of the LC circuit. In the illustrated embodiment of FIG. 1, control system 26 comprises a damper 32 for receiving an estimated or measured equivalent LC circuit impedance signal 34 and an LC filter signal 36 to generate damping signals 40, and a converter controller 30 uses the damping signals 40 to generating PWM control signals 28 for damping of the LC circuit. In this manner, damper 32 is adaptive during grid variations and transient events.

Figure 3:
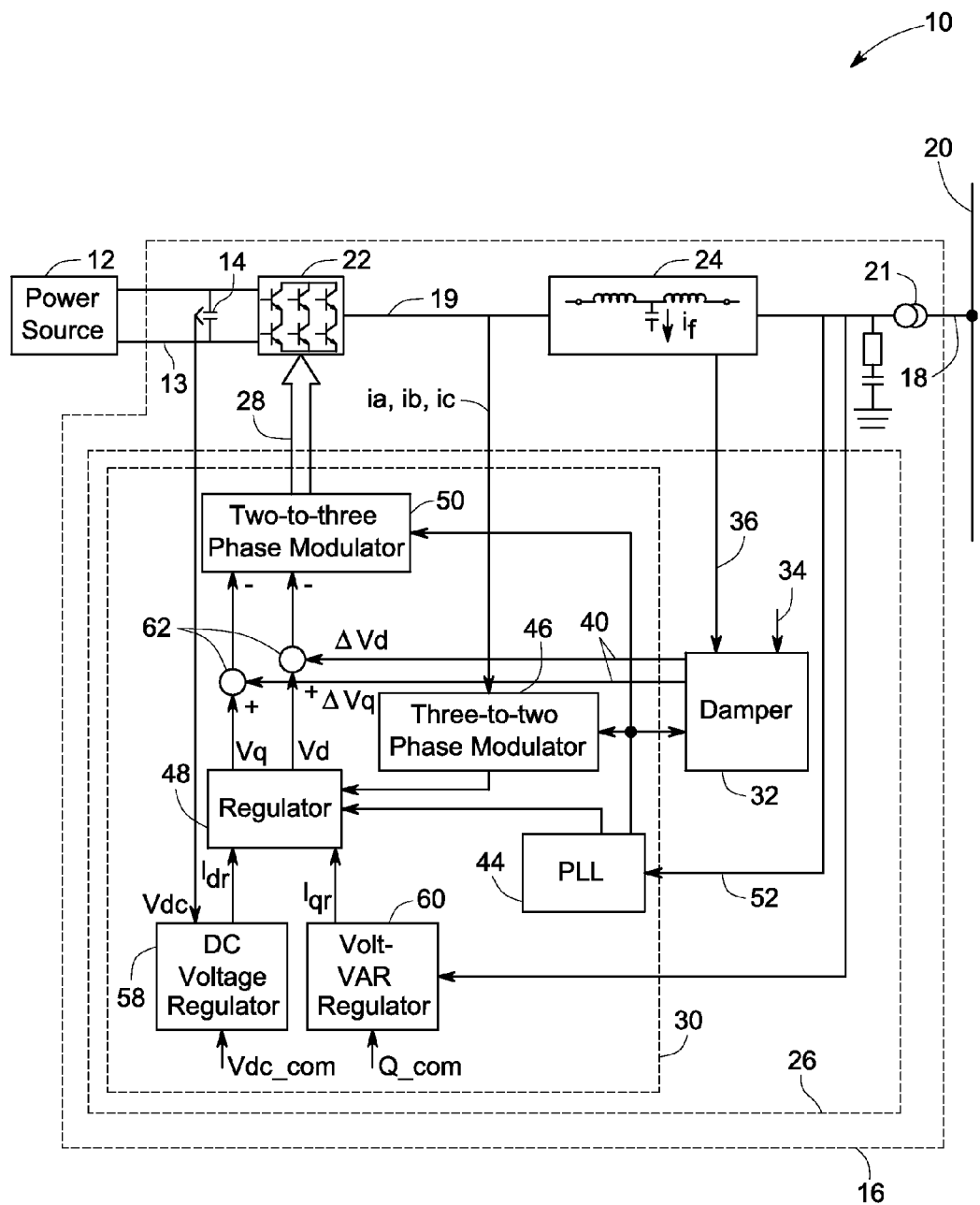
FIG. 3 is a block diagram of a power conversion module according to one embodiment of the present invention.

FIG. 3 is a block diagram of power generation system 10 in more detail according to one embodiment of the invention.

Converter controller 30 comprises a phase locked loop (PLL) circuit 44, a three-to-two phase converter 46, a converter regulator 48, and a two-to-three phase modulator 50. In certain embodiments of the invention, converter controller 30 may utilize any available control topologies in the technology field. In the illustrated embodiment, converter controller 30 receives a measured three-phase current reference signal ($i_a$, $i_b$, $i_c$) and controls converter 22 to generated a desired current output (alternating current 19). In other embodiments, converter controller 30 may receive measured voltage reference signals and control converter 22 to generate a desired voltage output. In the illustrated embodiment, converter controller 30 additionally receives measured DC link voltage $V_{dc}$ of DC link 13, and a power factor or reactive power command (Q_com) and performs DC link voltage control and power factor or reactive power control. In other embodiments (not shown), converter controller 30 may receive torque and generate a reference signal to perform torque control, for example.

In the illustrated embodiment of FIG. 3, PLL circuit 44 receives a measured three-phase reference voltage signal 52 and generates a synchronized frequency signal ($\omega_e$) and a synchronized phase signal ($\theta$). Three-to-two phase converter 46 receives the synchronized phase signal ($\theta$) from PLL circuit 44 and measured three-phase current feedback signals $i_a$, $i_b$, $i_c$ in a three-phase a-b-c reference frame from alternating current from power converter 22 and transforms three-phase quantities $i_a$, $i_b$, $i_c$ into two-phase quantities $i_d$ and $i_q$ in a synchronously rotating two-phase direct and quadrature (d-q) reference frame.

In the illustrated embodiment, converter controller 30 further comprises a DC voltage regulator 58 and a volt-VAR regulator 60 respectively for transmitting an $I_{dr}$ command and an $I_{qr}$ command to converter regulator 48. During steady state operation of power generation system 10, DC voltage regulator 58 receives a DC voltage command ($V_{dc\_com}$) and a DC voltage feedback signal $V_{dc}$ from DC link 13. DC voltage signal $V_{dc}$ is ideally maintained at a predetermined value but may be affected by changes in the active power (P) flowing through the power conversion module 16. DC voltage regulator 58 uses the DC voltage command and DC voltage feedback signal to generate an $I_{dr}$ command for converter regulator 48. Volt-VAR regulator 60 receives a reactive power command (Q_com) and an instantaneous measured reactive power signal such as a reactive power calculated from the reference voltage signal or a power factor from an output signal of power conversion module 16. Volt-VAR regulator 60 uses the reactive power command Q_com and feedback reactive power to generate an $I_{qr}$ command for converter regulator 48. Converter regulator 48 receives the $I_{dr}$, $I_{qr}$ command, the two-phase quantities $i_d$, $i_q$, and the synchronized frequency signal ($\omega_e$) from PLL 44 and generates a two-phase voltage control signal $V_d$, $V_q$. A damper 32 receives measured LC filter signal 36 and estimated or measure equivalent LC circuit impedance signal 34 and uses these signals to generate a two-phase voltage damping signal $\Delta V_d$, $\Delta V_q$ (damping signal 40).

In the illustrated embodiment of FIG. 3, the two-phase voltage damping signal $\Delta V_d$, $\Delta V_q$ is deducted from the two-phase voltage control signal $V_d$, $V_q$ at a summing junction pair 62 and is then transmitted to two-to-three modulator 50. Two-to-three phase modulator 50 converts the two-phase converter control signal back into a three-phase control signal and further generates PWM control signals 28 for semiconductor switches 23.

Figure 4:
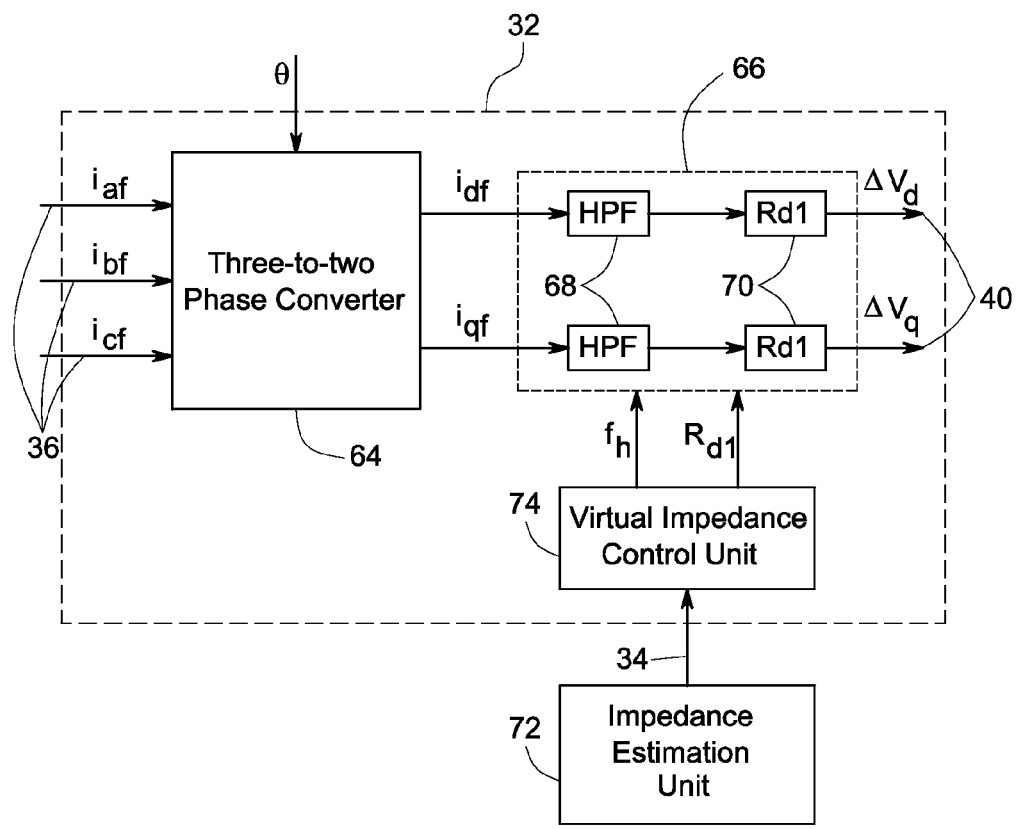
FIG. 4 is a block diagram of a damper in accordance with one embodiment of the present invention.

FIG. 4 illustrates a block diagram of damper 32 according to one embodiment of the invention. In the illustrated embodiment, damper 32 comprises a three-to-two phase converter 64 for receiving LC filter signal 36. In one embodiment, LC filter signal 36 is a measured three-phase current signal $i_{af}$, $i_{bf}$, $i_{cf}$ flowing through capacitors $C_f$ (FIG. 2) of each phase. Three-to-two phase converter 64 further receives a synchronized phase signal ($\theta$) from PLL circuit 44, and converts the three-phase current signal $i_{af}$, $i_{bf}$, $i_{cf}$ into two-phase current quantities $i_{df}$, $i_{qf}$ in the d-q reference frame. In another embodiment, the measured LC filter signal 36 is a measured voltage signal representing a voltage across capacitor $C_f$. Damper 32 receives the measured voltage signal and calculates an equivalent current signal flowing through capacitor $C_f$.

Damper 32 further comprises a damping controller 66 including two filters such as high pass filters (HPFs) 68 and two impedance simulators 70. HPFs 68 each have a threshold frequency $f_{h1}$ and allow frequency components in the two-phase current quantities $i_{df}$, $i_{qf}$ with frequencies higher than the threshold frequency $f_{h1}$ to pass to the impedance simulator 70 while blocking lower frequency components. In one embodiment, within the impedance simulators, the filtered two-phase current quantities are multiplied with a simulated resistance $R_{d1}$ to obtain the two-phase voltage damping signals $\Delta V_d$, $\Delta V_q$ according to:

$$\Delta V_d = K_1 \times i_{df} \times R_{d1}$$

$$\Delta V_q = K_1 \times i_{qf} \times R_{d1}$$

where "$K_1$" is a coefficient. In one embodiment $K_1=1$. Accordingly, the damping signal 40 obtained is a voltage damping signal, and a simulation of a physical resistor in serial connection with the capacitor $C_f$ is obtained.

In the illustrated embodiment, a virtual impedance control unit 74 of damper 32 receives estimated or measured equivalent LC circuit impedance signal 34 from an impedance estimation unit 72 to determine the threshold frequency $f_{h1}$ and the resistance value for the resistor $R_{d1}$. In one embodiment, impedance estimation unit 72 generates estimated equivalent LC circuit impedance signal 34 according to an estimated short-circuit capacity variation of grid 20. A larger short-circuit capacity represents a stronger grid condition, and a smaller short-circuit capacity represents a weaker grid condition. In one embodiment, impedance estimation unit 72 receives an estimated minimum short-circuit capacity of grid 20 and calculates the corresponding grid impedance at the minimum short-circuit capacity. Accordingly, in this embodiment, damper 32 is designed so that the LC circuit damping is effective during weak grid conditions. The short circuit capacity (MVA_short) may be expressed as:

$$MVA\_Short = \sqrt{3} * Vll * Is$$

wherein "MVA_Short" is the short-circuit capacity, "Vll" is the line voltage of grid 20, and "Is" is a short-circuit current of grid 20. Impedance Z of grid 20 may be expressed as:

$$|Z| = \frac{V_{ll}}{\sqrt{3} * Is}$$

$$= \frac{V_{ll}^2}{MVA\_Short}$$

Z, $R_g$, and $L_g$ may thus be expressed as $$|Z| = \sqrt{R_g^2 + X_g^2} = R_g\sqrt{1 + XOR^2} = X_g\frac{\sqrt{1 + XOR^2}}{XOR}$$

-continued $$R_g = \frac{|Z|}{\sqrt{1+XOR^2}} = \frac{V_u^2}{MVA\_Short*\sqrt{1+XOR^2}}$$

$$L_g = \frac{X_g}{\omega} = \frac{R_g*XOR}{\omega}$$

wherein "$R_g$" and "$L_g$" are respectively resistance and inductance of grid 20 and "XOR" represents a ratio between reactance and resistance of grid 20. Accordingly, impedance signals of grid 20 according to the estimated minimum short-circuit capacity of grid 20 are determined. Since impedances of other components in the LC circuit are relatively stable and known, an estimated impedance of the LC circuit can then be obtained. For example, in one embodiment, the impedance of LC filter 24 is calculated by using the ratings of the filter capacitor and inductors, and impedance of the transmission lines and other elements.

In the illustrated embodiment of FIG. 3, impedance estimation unit 72 transmits the equivalent LC circuit impedance signal 34 to a virtual impedance control unit 74. Virtual impedance control unit 74 calculates the resonance frequency $f_0$ of the LC circuit by solving the equation below:

$$L_1L_2Cs^3+(L_1R_2+L_2R_1)Cs^2+(R_1R_2C+L_1+L_2)s+(R_1+R_2)=0$$

wherein "$L_1$" and "$R_1$" are respectively inverter side filter inductance and resistance; "s" represents a derivative operator; "$L_2$" and "$R_2$" are respectively grid side filter inductance and resistance according to:

$$L_2=L_g+L_r, R_2=R_g+R_r$$

wherein "$L_r$" and "$R_r$" are respectively inductance and resistance of transmission line and other electronic elements between LC filter 24 and grid 20.

In certain embodiments, resonance frequencies $f_0$ can be obtained according to equation below, wherein the resistance components are ignored for simplification of the calculation.

$$f_0 = \frac{1}{2\pi\sqrt{\frac{L_1L_2C}{L_1+L_2}}}$$

In certain embodiments, virtual impedance control unit 74 generates the threshold frequency $f_{h1}$ for HPF 68 and selects a resistance value for damping controller 66. In one embodiment, the threshold frequency $f_{h1}$ is determined according to the fundamental frequency $f_1$ of alternating current 19 and the minimum resonance frequency $f_{01}$ corresponding to the minimum short-circuit capacity of grid 20. In one embodiment, threshold frequency $f_{h1}$ is lower than the resonant frequency $f_0$ and higher than fundamental frequency $f_1$ of alternating current 19 in order not to affect the fundamental performance $f_1$. In certain embodiments, the more distance the threshold frequency $f_{h1}$ is lower than the resonant frequency $f_0$, the better damping of the resonance can be obtained. In one embodiment, the threshold frequency $f_{h1}$ is less than the minimum resonance frequency $f_{01}$. In one specific embodiment, the threshold frequency is less than ⅕ of the minimum resonant frequency $f_{01}$. In another embodiment, each filter 68 is a band pass filters (BPF) comprising a lower and a higher threshold frequencies $f_{b1}$ and $f_{b2}$. The BPFs 68 allows frequency components in the two-phase current quantities $i_{df}, i_{qf}$ with frequencies between the lower and higher threshold frequencies $f_{b1}, f_{b2}$ to pass to the impedance simulator 70 while blocking other frequency components. In certain embodiments, the lower and higher threshold frequency $f_{b1}$, $f_{b2}$ are both higher than the fundamental frequency, and lower threshold frequency $f_{b1}$ is lower than the minimum resonance frequency $f_{01}$, and the higher threshold frequencies $f_{b2}$ is higher than the minimum resonance frequency $f_{01}$.

Figure 5:
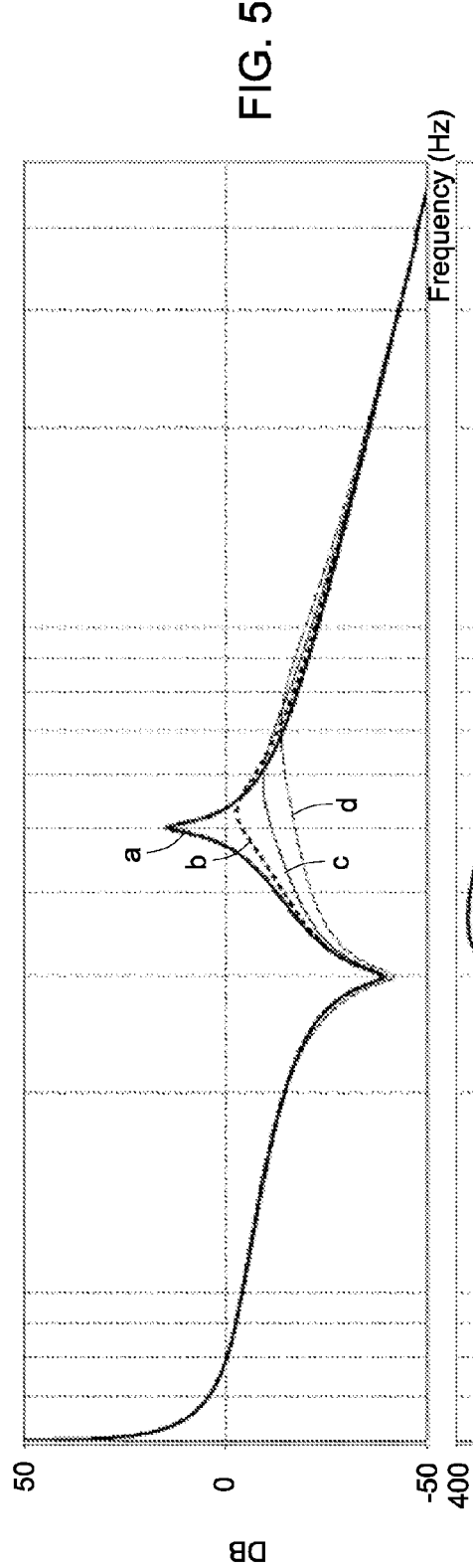
FIG. 5 is a graph of resonance peak attenuation using different damping resistor values within the simulation method according to one embodiment.
Figure 6:
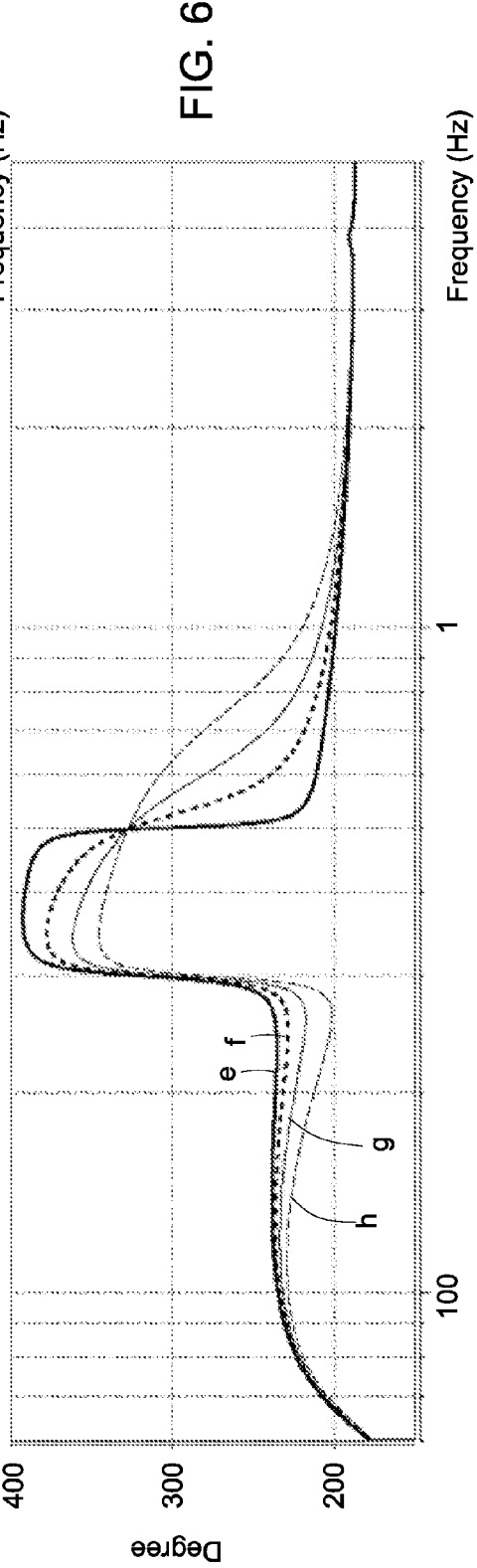
FIG. 6 is a graph of phase margin of the power conversion module using different resistor values within the simulation method according to one embodiment.

In certain embodiments, the virtual impedance control unit 74 determines the resistance value $R_{d1}$ to obtain a large resonance peak attenuation and maintain an adequate phase margin of the power conversion control system 26. FIGS. 5 and 6 respectively show simulated results for resonance peak attenuation and phase margin using several resistance values $R_{d1}$. In FIG. 5, curves a, b, c, d respectively show attenuation of resonance peaks with selected resistance $R_{d1}$=0, 0.2, 0.5, 1. Accordingly, the higher resistance $R_{d1}$ is, the better the attenuation of the resonance peak. In FIG. 6, the curves e, f, g, h respectively represent phase margin of the converter controller with selected resistor value=0, 0, 0.2, 0.5, 1. In certain embodiments, phase margin is important for evaluating stability of power conversion control system 26. Accordingly, the higher the resistance value $R_{d1}$ is, the lower the phase margin of the power conversion control system 26 is. In certain embodiments, the resistance value of $R_{d1}$ is less than a value corresponding to a minimum but safe phase margin of the power conversion control system 26. In one embodiment, a minimum phase margin is 45 degrees for example. In certain embodiments, the corresponding highest resistance value $R_{d1}$ can be obtained by searching in a look-up table, by observing experimental results, or by observing a correlation curve of the phase margin and the resistance value $R_{d1}$. The selected resistance value $R_{d1}$ is then used when multiplying the high frequency components of the filter current signal $i_{bf}, i_{cf}$ to obtain the damping voltage $\Delta V_d, \Delta V_q$. In other embodiments, an impedance such as an inductance, a capacitance, or any combination of inductance, capacitance and resistance, instead of the pure resistance $R_{d1}$, may be used in the damping controller 66 to simulate physical resistors, inductances and capacitors used for damping the LC circuit.

Figure 7:
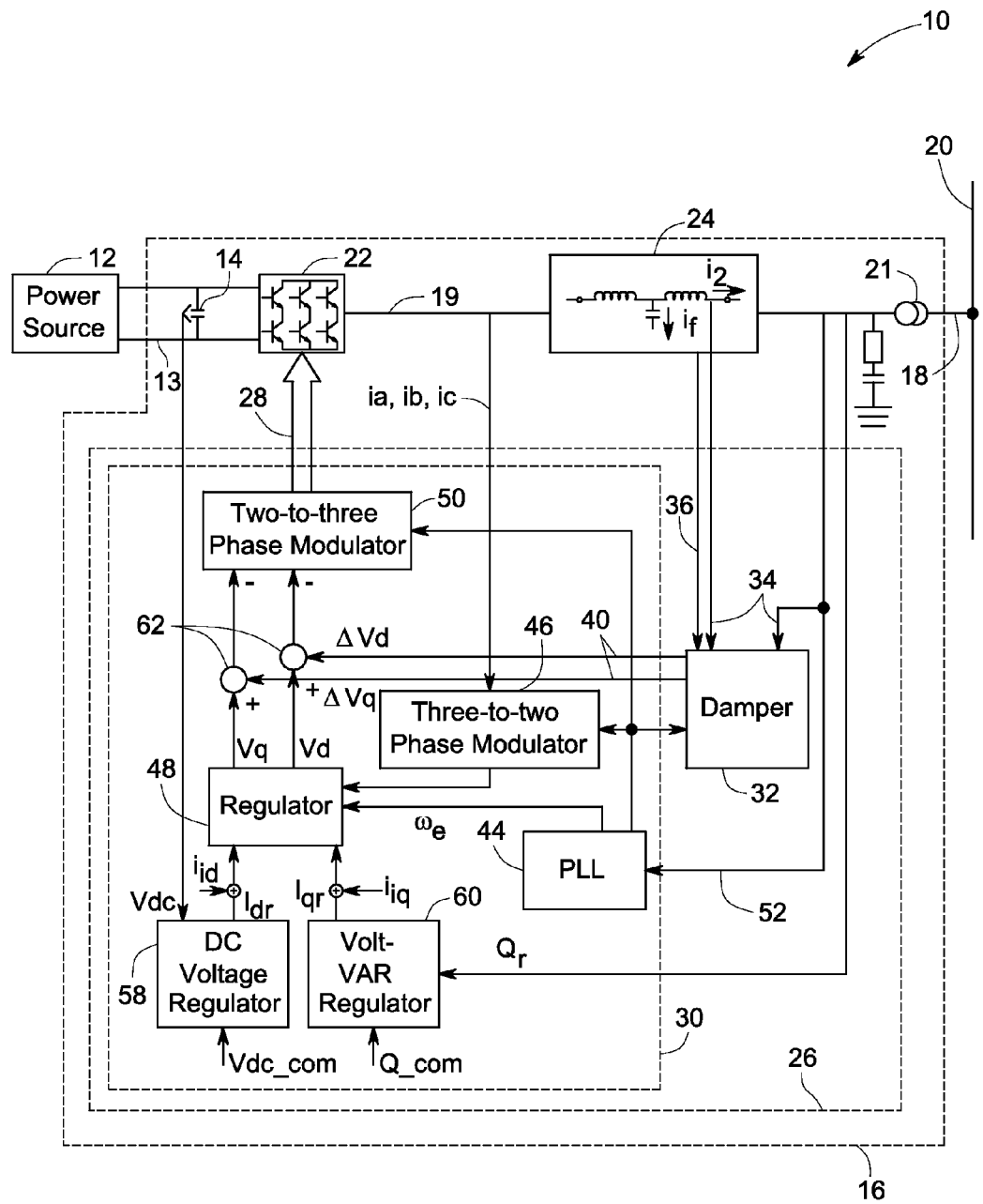
FIG. 7 is a block diagram of a power conversion module according to another embodiment of the present invention.

In another embodiment of the invention, the equivalent LC circuit impedance signal is measured on-line, off-line, or at certain time intervals. In one embodiment, as shown in FIG. 7, for example, a two-phase injection current $i_{id}, i_{iq}$ is injected via summation elements 76 in combination with $I_{dr}$ and $I_{qr}$ into converter regulator 48. In certain embodiments, the two-phase injection current $i_{id}, i_{iq}$ has an injection frequency $f_n$ which is different from the fundamental frequency $f_1$, and will not be reflected in the harmonic frequencies. One example for the injection frequency is 80 Hz. In the illustrated embodiment of FIG. 7, the two-phase injection current $i_{id}, i_{iq}$ is summed with the $I_{dr}$ and $I_{qr}$ commands and injected into converter regulator 48. Damper 32 receives a three-phase grid side current $i_2$ at the grid side of the LC circuit and the three-phase voltage signal 52 at the grid side of the LC circuit at the injection frequency $f_n$. Accordingly, the grid side impedance of the LC circuit can be obtained according to the grid side voltage and current signals at the injection frequency $f_n$. The LC circuit impedance can be obtained according to the converter side impedance which has smaller variations, capacitance $C_f$, and the grid side impedance obtained.

Figure 8:
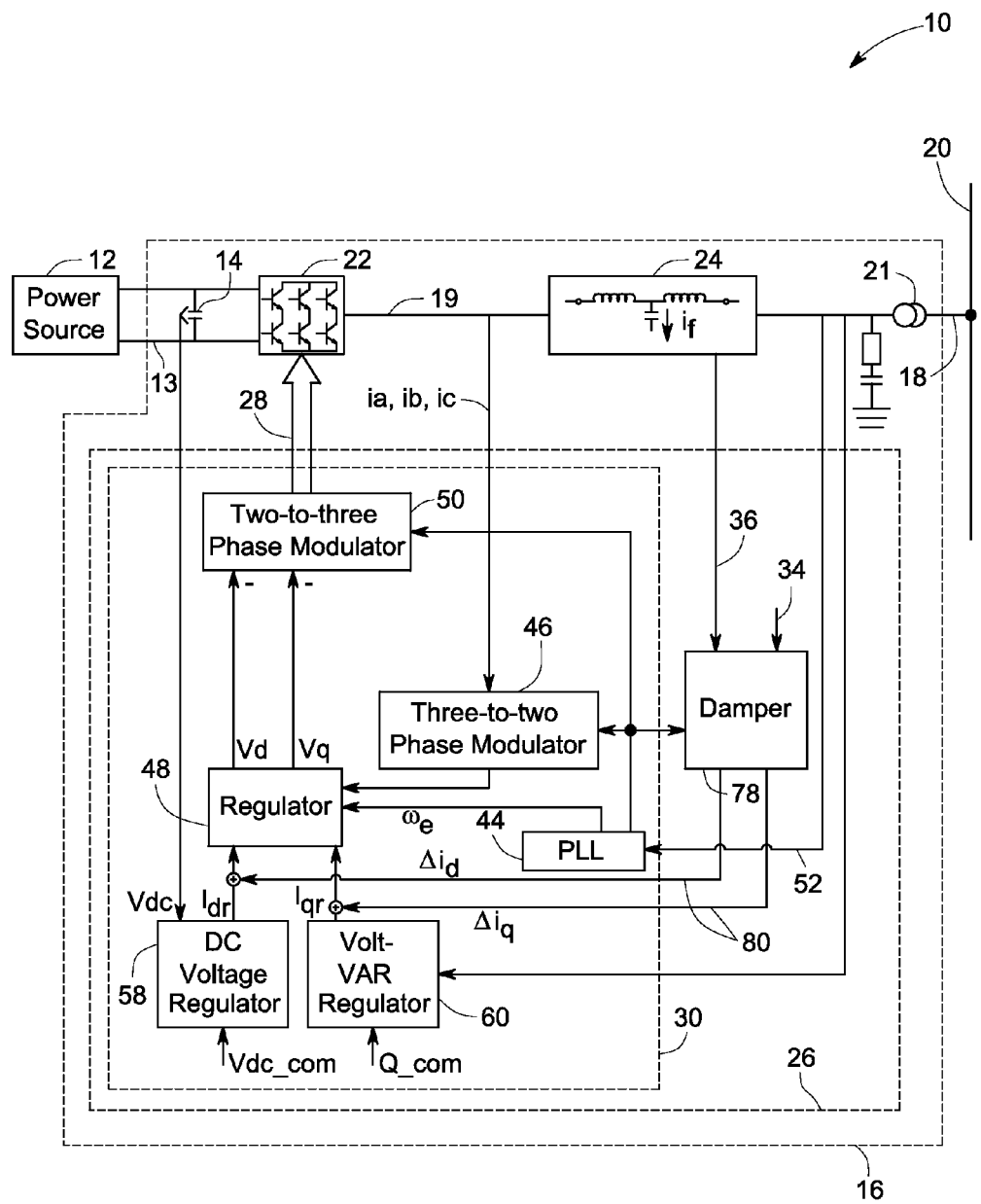
FIG. 8 is a block diagram of a power conversion module according still another embodiment of the present invention.

Referring to FIG. 8, a damper 78 according to another embodiment of invention receives an estimated or measured equivalent LC circuit impedance signal 34 and an LC filter signal 36 to generate a current damping signal 80 ($\Delta i_d, \Delta i_q$). Converter controller 30 uses the current damping signals 80 to generate PWM control signals 28 which are used to simulate a physical resistance $R_{d2}$ (FIG. 2) in parallel with capacitor $C_f$ for damping of the LC circuit. In the illustrated embodiment of FIG. 7, the current damping signal 80 is added in the $I_d$, $I_q$ commands for converter control.

Figure 9:
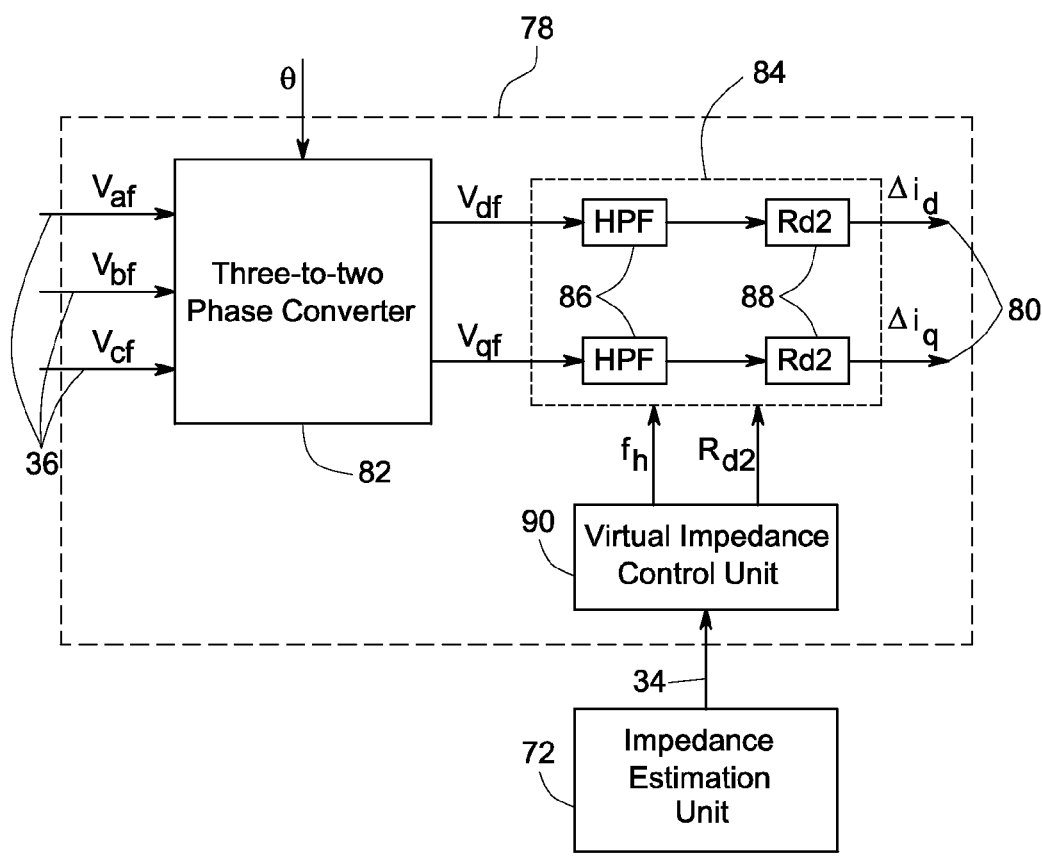
FIG. 9 is a block diagram of a damping in accordance with another embodiment of the invention.

Referring to FIG. 9, which shows damper 78 in more detail, in one embodiment, LC filter signal 36 is a measured three-phase voltage signal ($V_{af}$, $V_{bf}$, $V_{cf}$) representing a voltage across capacitor $C_f$ of each phase. In another embodiment, LC filter signal 36 is three phase current signal, representing three-phase current flowing through capacitors $C_f$ of each phase, from which the voltage signal may be calculated. In the illustrated embodiment, a three-to-two phase converter 82 receives the three-phase voltage signal $V_{af}$, $V_{bf}$, $V_{cf}$ and the phase signal θ from PLL to convert the three-phase voltage signal into $V_{af}$, $V_{bf}$, $V_{cf}$ into two phase voltage quantities $V_{df}$, $V_{qf}$ in the rotating d-q reference frame.

In the illustrated embodiment, damper 78 further comprises a damping controller 84 including two high pass filters (HPFs) 86 and two impedance simulators 88. HPFs 86 each have a threshold frequency $f_{h2}$ and allow frequency components in the two-phase voltage quantities $V_{df}$, $V_{qf}$ with frequencies higher than the threshold frequency $f_{h2}$ to pass to the impedance simulator 88 while blocking lower frequency components. In one embodiment, within the impedance simulators 88, the filtered two-phase voltage quantities are divided by a simulated impedance, such as resistance $R_{d2}$, to obtain the two-phase current damping signals $\Delta i_d$, $\Delta i_q$ according to:

$$\Delta i_d = k_2 \times \frac{V_{df}}{R_{d2}}$$

$$\Delta i_q = k_2 \times \frac{V_{qf}}{R_{d2}}$$

where "$K_2$" is a coefficient. In one embodiment $K_2=1$. Accordingly, the damping signal 80 obtained is a current damping signal, and a simulation of a physical resistor in parallel connection with the capacitor $C_f$ is obtained.

In the illustrated embodiment, a virtual impedance control unit 90 of damper 78 receives estimated or measured equivalent LC circuit impedance signal 34 from an impedance estimation unit 72 to determine the threshold frequency $f_{h2}$ and the resistance value for the resistor $R_{d2}$. In certain embodiments, estimated or measured equivalent LC circuit impedance signal 34 can be obtained as the embodiment described above with reference to FIGS. 4 and 7. In one embodiment, virtual impedance control unit 90 determines the threshold frequency $f_{h2}$ for HPFs 86 according to the fundamental frequency $f_1$ and the resonance frequency $f_0$ as discussed above.

In certain embodiments, virtual impedance control unit 90 determines the resistance value $R_{d2}$ to obtain a large resonance peak attenuation and maintain an adequate phase margin of the power conversion control system 26. FIGS. 10 and 11 respectively show simulated results for resonance peak attenuation and phase margin using several resistance values $R_{d2}$. In FIG. 10, curve i shows a resonance peak without a simulation of the resistance, and curves j, k, l respectively show attenuation of resonance peaks with selected resistance $R_{d2}=3$, 1, 0.2. Accordingly, the smaller resistance $R_{d2}$ is, the better the attenuation of the resonance peak. In FIG. 11, the curve m represents a phase margin of converter controller without using the damping method, and curves n, o, p respectively represent phase margin of the converter controller with selected resistor value $R_{d2}=3$, 1, 0.2. Accordingly, the smaller the resistance value $R_{d2}$ is, the lower the phase margin of the power conversion control system is. In certain embodiments, the resistance value of $R_{d2}$ is larger than a value corresponding to a minimum but safe phase margin of the power conversion control system 26. In one embodiment, a minimum phase margin is 45 degrees for example. In certain embodiments, the corresponding smallest resistance value $R_{d2}$ can be obtained by searching in a look-up table, by observing experimental results, or by observing a correlation curve of the phase margin and the resistance value $R_{d2}$. The selected resistance value $R_{d2}$ is then divided by the high frequency components of the filter voltage signal $V_{df}$, $V_{qf}$ to obtain the current damping signal $\Delta i_d$, $\Delta i_q$. In other embodiments, an impedance such as an inductance, a capacitance, or any combination of inductance, capacitance and resistance, instead of the pure resistance $R_{d2}$, may be used in the damping controller 66 to simulate physical resistors, inductances and capacitors used for damping the LC circuit.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power conversion system comprising:
   a power converter comprising a plurality of semiconductor power switches;
   an LC filter coupled between an output of the power converter and an electric grid, the LC filter comprising an inductor coupled in series to the electric grid, and a capacitor, wherein the LC filter and the grid result in an equivalent LC circuit comprising an impedance of the LC filter and an impedance of the electric grid; and
   a power conversion control system comprising:
      a damper to receive an LC filter signal and an equivalent LC circuit impedance signal, and to generate a damping signal; and
      a converter controller to receive a current or voltage reference signal, a current or voltage command signal, and the damping signal to generate control signals for driving switching operations of the semiconductor power switches.

2. The power conversion system of claim 1, wherein the LC filter signal comprises a current signal of the capacitor in the LC filter, and the damping signal comprises a voltage damping signal or a current damping signal.

3. The power conversion system of claim 2, wherein the damper comprises a damping controller comprising an impedance simulator.

4. The power conversion system of claim 3, wherein the damper comprises a virtual impedance control unit to calculate a resonance frequency of the equivalent LC circuit based on the equivalent LC circuit impedance signal.

5. The power conversion system of claim 4, wherein the virtual impedance control unit is further configured to determine a resistance value for the impedance simulator suitable for obtaining sufficient resonance peak attenuation while maintaining an adequate phase margin for the power conversion control system.

6. The power conversion system of claim 5, wherein the virtual impedance control unit is configured to select the resistance value to be the largest or smallest resistance value possible while the phase margin is above 45 degrees.

7. The power conversion system of claim 6, wherein the damping controller further comprises a filter to block frequency components with a frequency lower than a threshold frequency from reaching the impedance simulator.

8. The power conversion system of claim 7, wherein the threshold frequency is lower than the resonance frequency and higher than a fundamental frequency.

9. The power conversion system of claim 2, wherein the damper comprises an impedance estimation unit to calculate an impedance of the electric grid according to an estimated minimum short-circuit capacity of the electric grid.

10. The power conversion system of claim 2, further comprising an impedance estimation unit to receive an injection signal at an injection frequency which is injected to a current command of the converter controller, and a measured voltage of the injection frequency to determine the equivalent LC circuit impedance signal, wherein the injection frequency is different from the fundamental frequency of the alternating current and is different from any of harmonic frequencies generated by switching of the semiconductor power switches.

11. A method for damping an equivalent LC circuit between a power converter and an electric grid, wherein the equivalent LC circuit comprises an impedance of an LC filter coupled between the power converter and the electric grid, an impedance of the electric grid; and a capacitor, the method comprising:
   receiving a current or voltage signal of the capacitor;
   receiving an equivalent LC circuit impedance;
   estimating a resonance frequency of the LC circuit according to the equivalent LC circuit impedance;
   determining a resistance value for obtaining sufficient resonance peak attenuation and maintaining an adequate phase margin of the power converter;
   generating a damping signal based on the resistance value and the current or voltage signal of the capacitor; and
   using the damping signal to generate current or voltage commands to control the power converter.

12. The damping method of claim 11, wherein receiving the current or voltage signal of the capacitor comprises receiving a current signal of the capacitor, and wherein generating a damping signal according to the resistance value and the current or voltage signal of the capacitor comprises multiplying the current signal of the capacitor and the resistance value to get a damping voltage signal.

13. The damping method of claim 11, wherein receiving the current or voltage signal of the capacitor comprises receiving a voltage signal of the capacitor, and wherein generating a damping signal according to the resistance value and the current or voltage signal of the capacitor comprises dividing the voltage signal of the capacitor by the resistance value to get a damping current signal.

14. The damping method of claim 11, wherein receiving the equivalent LC circuit impedance signal comprises calculating an estimated impedance signal according to a minimum short-circuit capacity of the electric grid.

15. The damping method of claim 11, further comprising passing the current or voltage signal of the capacitor through a high pass filter.

16. The damping method of claim 15, wherein a threshold frequency of the high pass filter is determined according to the resonance frequency and a fundamental frequency, and wherein the threshold frequency of the high pass filter is lower than the resonance frequency and higher than the fundamental frequency.

17. A power system comprising:
   a photovoltaic power source to generate a direct current at a DC link; and
   a power conversion module to transform the direct current from the DC link into an alternating current, the power conversion module comprising:
   a power converter comprising a plurality of semiconductor power switches;
   an LC filter coupled between an output of the power converter and an electric grid, the LC filter comprising an inductor coupled in series to the electric grid, and a capacitor coupled in parallel to the electric grid, wherein the LC filter and the grid result in an equivalent LC circuit comprising an impedance of the LC filter and an impedance of the electric grid; and
   a power conversion control system comprising:
      a damper to receive an LC filter signal and an equivalent LC circuit impedance signal, and to generate a damping signal; and
      a converter controller to receive a current or voltage reference signal, a current or voltage command signal, and the damping signal to generate control signals for driving switching operations of the semiconductor power switches.

* * * * *